(12) United States Patent
Matsui

(10) Patent No.: US 8,253,805 B2
(45) Date of Patent: Aug. 28, 2012

(54) HORIZONTAL SYNCHRONIZATION DETECTION DEVICE

(75) Inventor: Takeo Matsui, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1079 days.

(21) Appl. No.: 12/216,960

(22) Filed: Jul. 14, 2008

(65) Prior Publication Data

US 2009/0059070 A1 Mar. 5, 2009

(30) Foreign Application Priority Data

Aug. 28, 2007 (JP) ................................. 2007-220758

(51) Int. Cl.
*H04N 5/04* (2006.01)

(52) U.S. Cl. .......................... 348/194; 348/531; 348/540

(58) Field of Classification Search ........................ None
See application file for complete search history.

(56) References Cited

U.S. PATENT DOCUMENTS

| 4,445,092 | A | | 4/1984 | Yoshinaka et al. |
| 5,677,743 | A | * | 10/1997 | Terao et al. .................... 348/735 |
| 5,767,917 | A | | 6/1998 | Gornstein et al. |
| 5,923,377 | A | | 7/1999 | Kenmochi et al. |
| 6,801,246 | B2 | * | 10/2004 | Horlander ..................... 348/194 |
| 7,508,453 | B2 | * | 3/2009 | Lee ............................... 348/558 |

FOREIGN PATENT DOCUMENTS

| JP | 61-70861 | 4/1986 |
| JP | 61-070861 A | 4/1986 |
| JP | 2-283172 A | 11/1990 |
| JP | 11-239281 | 8/1999 |
| JP | 3028525 | 2/2000 |
| JP | 2002-300424 | 10/2002 |
| JP | 2004-215004 | 7/2004 |
| JP | 2004-215004 A | 7/2004 |

OTHER PUBLICATIONS

European Search Report dated Feb. 23, 2009.

\* cited by examiner

*Primary Examiner* — Marivelisse Santiago Cordero
*Assistant Examiner* — Kent Yip
(74) *Attorney, Agent, or Firm* — McGinn IP Law Group, PLLC

(57) ABSTRACT

Pulse detection portion detects pulses in a horizontal synchronization signal and acquires the occurrence period and the pulse width of the detected pulses. Synchronization pulse decision portion determines pulses, for which the differences between the occurrence period and the reference period and between the pulse width and the reference pulse width are within their respective error tolerance ranges, as synchronization pulses. Mean period acquisition portion obtains the mean period by averaging occurrence periods of the synchronization pulses. Reference period correction portion carries out either or both of correcting the reference period so as to get closer to the mean period and correcting the error tolerance range of the reference period so as to get narrower, under the condition that the occurrence frequency of the synchronization pulses for which the difference between the occurrence period and the mean period is outside of a predetermined tolerance range exceeds a predetermined threshold.

20 Claims, 1 Drawing Sheet

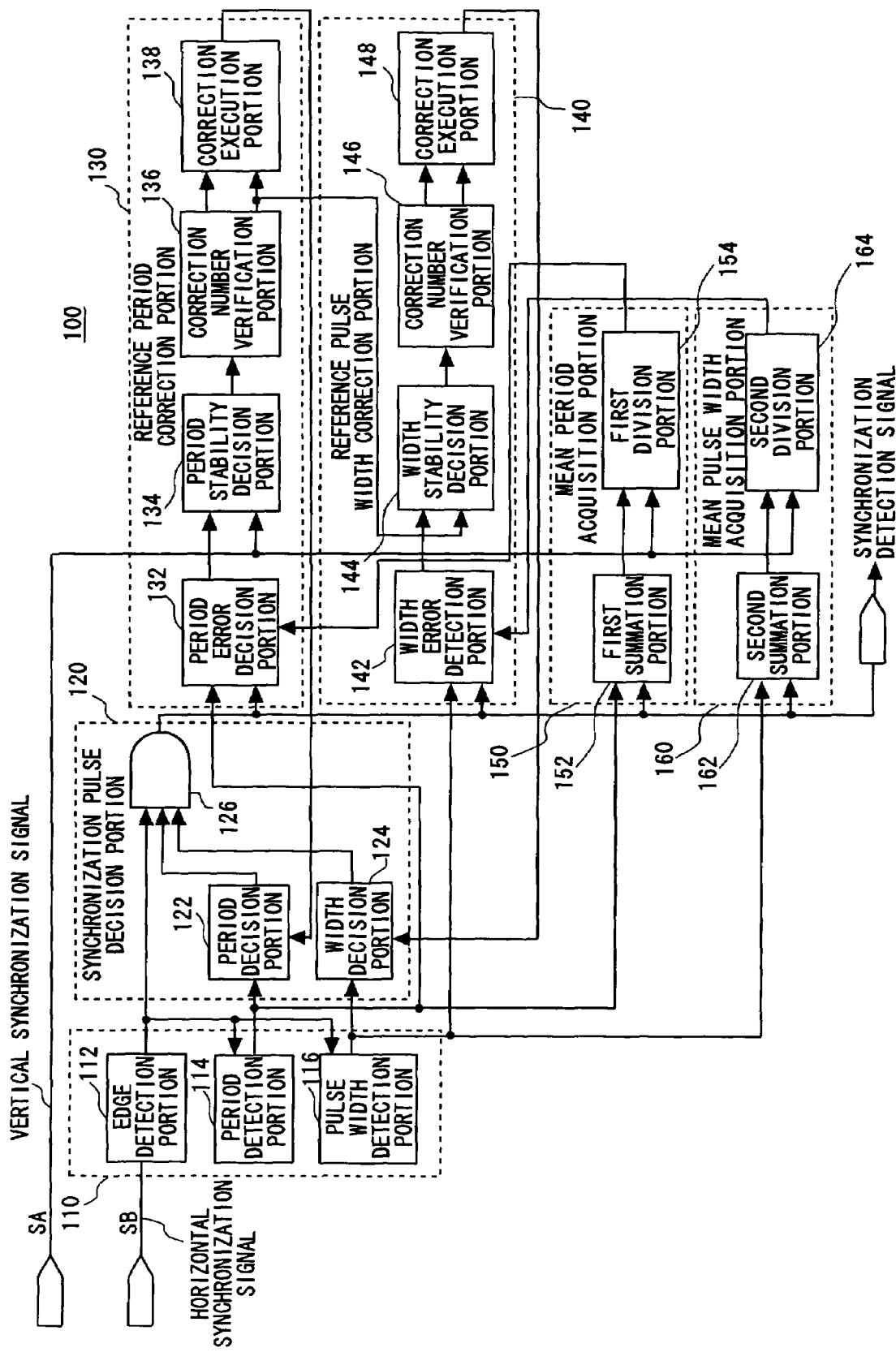

HORIZONTAL SYNCHRONIZATION DETECTION DEVICE

BACKGROUND OF THE INVENTION

1. Field of the Invention

The present invention related to a horizontal synchronization detection technique.

2. Description of Related Art

There are many standards for video signal formats, and video signals having such various formats are inputted to a video display device. A video display device needs to carry out horizontal synchronization detection to reproduce images from input video signals, and various techniques have been proposed for that purpose.

Japanese unexamined patent application publication No. 11-239281 (Patent document 1) discloses a horizontal synchronization detection method in which a pulse period and a pulse width are detected from a synchronization signal component, and a detection signal is outputted on condition that the detected pulse period and detected pulse width are equal to the period and width, respectively, of the horizontal synchronization signal. This method is effective when the pulse period and pulse width of the horizontal synchronization signal are known in advance.

Japanese unexamined patent application publication No. 61-70861 (Patent document 2) discloses another horizontal synchronization detection method in which a pulse period having the same pulse width as the prescribed pulse width (the pulse width of the horizontal synchronization signal) is detected from a synchronization signal component, and the mean value of the detected pulse periods is determined. Then, a detection signal is outputted on condition that the difference between the detected pulse period and the mean value is smaller than a predetermined value. This method can eliminate noises by restricting the width of pulses that are detected as the synchronization signal, when the pulse width of the horizontal synchronization signal of the input video signal is known in advance.

Japanese unexamined patent application publication No. 2004-215004 (Patent document 3) discloses a method in which the pulse width of synchronization signal component that is separated from the video signal is measured, and pulses whose pulse width is within a predetermined reference range are outputted as the horizontal synchronization signal. Furthermore, the frequency of the synchronization signal component is measured, and the type of the video signal is determined based on the measured frequency, and the reference range of pulse width is changed based on the type of the video signal. This method is fundamentally similar to the method of the Patent document 2. However, since the method determines the type of a video signal and changes the reference range of pulse width based on the type, it enables the method of the Patent document 2 to be applied, even if the pulse width of the horizontal synchronization signal is unknown in advance.

Japanese unexamined patent application publication No. 2002-300424 (Patent document 4) discloses a method in which a noise component is masked by generating a mask signal having a frequency corresponding to the frequency of the horizontal synchronization signal to carry out horizontal synchronization detection, and the phase of the mask signal is adjusted when the synchronization signal pulses to be detected are not detected. While this method can mask the noise component, it can also prevent detection failure of horizontal synchronization signal pulses caused by the out-of-phase mask signal.

Japanese patent No. 3028525 (Patent document 5) discloses a method in which a pulse period is measured in a synchronization signal component, and the mask area of the synchronization signal component is adjusted based on the measurement. This method can detect a horizontal synchronization signal even when the pulse width of the horizontal synchronization signal is unknown in advance, and prevent equivalent pulses from being detected as the synchronization signal pulses.

In recent years, the types of video signals have increased, and there have been various pulse periods and pulse widths of the horizontal synchronization signals of video signals. Therefore, although the pulse period and pulse width of an input video signal are often unknown in advance, accurate horizontal synchronization detection needs to be carried out even in such cases.

The method of the Patent document 1 cannot be used unless the pulse period and pulse width of the horizontal synchronization signal of in input video signal are known in advance.

The method of the Patent document 2 detects only pulses having the same width as the pulse width of the horizontal synchronization signal, and uses the mean period of the detected pulses as the reference value to determine whether or not the detected pulses are genuine synchronization pulses. When the horizontal synchronization signal has an overshoot or undershoot, a pulse width cannot be always detected accurately. Therefore, it is difficult to eliminate noises by restricting the width of the detected pulses. Furthermore, when the difference between the widths of noises and the pulse width of the horizontal synchronization signal is small, it is impossible to eliminate noises by restricting the pulse width. When noises are not eliminated by the pulse width, the mean period that is used as the criterion is affected by the noises, and therefore it poses a problem that correct detection results cannot be obtained.

These facts hold true for the Patent document 3. Furthermore, in the case of the Patent document 3, the type of a video signal is determined, and the reference range is changed based on the type. However, since it is difficult to determine the type of a video signal in the state where the signal contains noises, it may misjudge the type of the video signal and change the reference range of pulse width to a wrong range.

The method of the Patent document 4 requires that the frequency of the horizontal synchronization signal of an input video signal is known in advance.

The method of the Patent document 5 measures a pulse period in a synchronization signal component, and adjusts the mask area of the synchronization signal component based on the measurement. However, since it does not carry out a noise elimination process when periods are measured, the measurement result may be affected by noises and the horizontal synchronization detection may not be carried out correctly.

SUMMARY

One embodiment in accordance with the present invention is a horizontal synchronization detection device. The horizontal synchronization detection device includes a pulse detection portion, a synchronization pulse decision portion, a mean period acquisition portion, and a reference period correction portion.

The pulse detection portion detects pulses in a horizontal synchronization signal, and acquires an occurrence period of the detected pulses.

The synchronization pulse decision portion determines pulses whose occurrence period is within an error tolerance range as the synchronization pulses.

The mean period acquisition portion provides the mean period by averaging the occurrence periods of the synchronization pulses.

The reference period correction portion carries out either or both of correcting the reference period so as to get closer to the mean period and correcting the error tolerance range of the reference period such that the error tolerance range becomes narrower, under the condition that the occurrence frequency of the synchronization pulses for which the difference between the occurrence period and the mean period is outside of a predetermined tolerance range exceeds a predetermined threshold.

Incidentally, an entity of the above-mentioned device, which is expressed as a method, a system, or a program, is also considered to be an embodiment of the present invention.

In accordance with a technique in accordance with the present invention, horizontal synchronization detection can be carried out correctly even when the period of a horizontal synchronization signal is unknown in advance

BRIEF DESCRIPTION OF THE DRAWINGS

The above and other objects, advantages and features of the present invention will be more apparent from the following description of certain preferred embodiments taken in conjunction with the accompanying drawings, in which:

FIG. 1 shows a horizontal synchronization detection device in accordance with one embodiment of the present invention.

DETAILED DESCRIPTION OF THE PREFERRED EMBODIMENT

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Embodiments of the present invention are explained hereinafter with reference to the drawing. FIG. 1 shows a horizontal synchronization detection device 100 in accordance with one embodiment of the present invention. The horizontal synchronization detection device 100, to which a vertical synchronization signal SA and a horizontal synchronization signal SB both of which are separated from an input video signal are inputted, includes a pulse detection portion 110, a synchronization pulse decision portion 120, a reference period correction portion 130, a reference pulse width correction portion 140, a mean period acquisition portion 150, and a mean pulse width acquisition portion 160.

The pulse detection portion 110 includes an edge detection portion 112, a period detection portion 114, and a pulse width detection portion 116, and detects pulses in the horizontal synchronization signal SB and acquires the occurrence period (which is also called simply "period" hereinafter) and the pulse width of the detected pulses. Specifically, the edge detection portion 112 detects the rising and falling edges in the horizontal synchronization signal SB, and provides their timing information to the period detection portion 114 and pulse width detection portion 116. The edge detection portion 112 also outputs High level to a logical multiplication circuit 126 of the synchronization pulse decision portion 120 (which is explained later) when it detects the falling edge. The period detection portion 114 detects a pulse period by, for example, counting the system clock during the time period between the falling timing of the immediately preceding pulse and the current falling timing, and outputs the detected pulse period to a period decision portion 122 of the synchronization pulse decision portion 120 (which is explained later). The pulse width detection portion 116 detects the pulse width of the current pulse by, for example, counting the system clock during the time period between the rising edge and the falling edge, and outputs it to a width decision portion 124 of the synchronization pulse decision portion 120 (which is explained later).

The synchronization pulse decision portion 120, which determines whether or not the pulse detected by the pulse detection portion 110 is the synchronous pulse, includes a period decision portion 122, a width decision portion 124, and a logical multiplication circuit 126. The period decision portion 122 compares a period from the period detection portion 114 and a predetermined reference period, and outputs High level to the logical multiplication circuit 126 when the difference between the period from the period detection portion 114 and the reference period is within an error tolerance range, and outputs Low level to the logical multiplication circuit 126 when the difference is outside of the error tolerance range. The width decision portion 124 compares a pulse width from the pulse width detection portion 116 and a predetermined reference pulse width, and outputs High level to the logical multiplication circuit 126 when the difference between the pulse width from the pulse width detection portion 116 and the reference pulse width is within an error tolerance range, and output Low level to the logical multiplication circuit 126 when the difference is outside of the error tolerance range. The logical multiplication circuit 126 receives the outputs from the edge detection portion 112, period decision portion 122, and width decision portion 124, and output High level, i.e., a synchronization detection signal when all of these three outputs are High levels.

That is, the synchronization pulse decision portion determines, among the pulses that are detected by the pulse detection portion 110, only the pulses, for which the differences between their periods and the reference period are within the error tolerance range and the differences between their pulse widths and the reference pulse width are within the error tolerance range, as the synchronization pulses.

The mean period acquisition portion 150 includes a first summation portion 152 and a first division portion 154, and calculates the mean value of the pulse periods (mean period) of the pulses that are determined as the synchronization pulses by the synchronization pulse decision portion 120. Specifically, the first summation portion 152 receives outputs from the period detection portion 114 and logical multiplication circuit 126, and adds up the periods that are detected by the period detection portion 114 when the logical multiplication circuit 126 outputs High level. The first division portion 154 receives the output from the first summation portion 152 and the vertical synchronization signal, and acquires the mean period of the synchronization pulses by dividing the summation result from the first summation portion 152 by the number of additions during the occurrence interval of the vertical synchronization signal at the occurrence timing of the vertical synchronization signal. The first division portion 154 outputs the mean period obtained in this manner to a period error decision portion 132 of the reference period correction portion 130 (which is explained later).

The mean pulse width acquisition portion 160 includes a second summation portion 162 and a second division portion 164, and calculates the mean value of the pulse widths (mean pulse width) of the pulses that are determined as the synchronization pulses by the synchronization pulse decision portion 120. Specifically, the second summation portion 162 receives outputs from the pulse width detection portion 116 and logical multiplication circuit 126, and adds up the pulse widths that are detected by the pulse width detection portion 116 when the logical multiplication circuit 126 outputs High level. The second division portion 164 receives the output from the second summation portion 162 and the vertical synchronization signal, and acquires the mean pulse width of the synchronization pulses by dividing the summation result by the second summation portion 162 by the number of additions during the occurrence interval of the vertical synchronization signal at the occurrence timing of the vertical synchronization signal. The second division portion 164 outputs the mean pulse width obtained in this manner to a pulse width error detection portion 142 of the reference pulse width correction portion 140 (which is explained later).

The reference period correction portion 130 includes a period error decision portion 132, a period stability decision portion 134, a correction number verification portion 136, and a correction execution portion 138.

The period error decision portion 132 receives outputs from the period detection portion 114, logical multiplication circuit 126, and mean period acquisition portion 150, compares the periods of pulses that are determined as the synchronization pulses and the mean period that is acquired by the mean period acquisition portion 150 and stored in the previous field, and verifies whether or not those differences are within a predetermined tolerance range, e.g., within the range of the mean period ±1/32. The period error decision portion 132, in addition to carrying out these verifications, adds up the occurrences of the synchronization pulses for which the above-mentioned differences are outside of the tolerance range, and occurrences of the synchronization pulses for which the above-mentioned differences are within the tolerance range, respectively, during one field time period.

The period stability decision portion 134 receives the summation result of the period error decision portion 132 and the vertical synchronization signal, and determines the stability of the periods of the synchronization pulses by verifying the frequency of occurrence that the above-mentioned difference is outside of the tolerance range at the occurrence timing of the vertical synchronization signal. Specifically, the period stability decision portion 134 compares two summation results obtained by the period error decision portion 132, and determines that the periods of the synchronization pulses are stable when the number of the above-mentioned differences that are within the tolerance range is equal to or greater than a threshold that is determined based on the number of the differences that are outside of the tolerance range, e.g., a value 1.25 times as large as the number of the differences that are outside of the tolerance range, and determines that the periods of the synchronization pulses are unstable when that is not the case. Then, the period stability decision portion 134 outputs the decision result to the correction number verification portion 136.

When the period stability decision portion 134 determines that the periods of the synchronization pulses are stable, it is supposed that the reference period and its tolerance range, both of which are used by the period decision portion 122 to determine whether or not pulses are synchronization pulses, are consistent with the current horizontal synchronization signal. On the other hand, when the period stability decision portion 134 determines that the periods of the synchronization pulses are unstable, it is supposed that the reference period, which is used by the period decision portion 122 to determine whether or not pulses are synchronization pulses, is not consistent with the current horizontal synchronization signal, or the tolerance range is too wide so that it tends to pick up noises. Therefore, either or both of the reference period and the error tolerance range can be corrected so that only genuine synchronization pulses are detected. In the correction, the reference period may be corrected, for example, to the middle value between the current reference period and the mean period so as to get closer to the mean period, and the error tolerance range is corrected so as to become narrower. Incidentally, matters such as whether only one of the reference period and the error tolerance range should be corrected or both of them should be corrected, and which correction has a higher priority if both are to be corrected may be left to the discretion of the designer depending on the particular application or the like. However, in view of the fact that the error tolerance range is usually established to have sufficiently narrow range, the correction of the reference period preferably has the higher priority. In this embodiment, only the reference period is corrected as an example.

The correction execution portion 138 corrects the reference period that is used by the period decision portion 122 so as to get closer to the mean period, under the condition that the period stability decision portion 134 determines the periods are unstable, and the correction number verification portion 136 verifies that the number of corrections of the reference period is equal to or less than a predetermined number of times, e.g., four times. Incidentally, when the correction number verification portion 136 verifies that the number of corrections of the reference period reaches the predetermined number, the reference pulse width correction portion 140 corrects the reference pulse width. The detail of it is explained later. When that happened, the correction execution portion 138 restores the reference period used by the period decision portion 122 to its initial value.

The correction number verification portion 136 counts the number of corrections of the reference period from the initial value. Furthermore, the correction number verification portion 136 outputs a signal instructing that the reference period be restored to the initial value to the correction execution portion 138, and resets the count value to zero, when the period stability decision portion 134 determines that "the periods of the synchronization pulses are unstable", and the count number reaches the predetermined number of four. Furthermore, the correction number verification portion 136 also outputs an instruction for correction of the reference pulse width to a width stability decision portion 144 of the reference pulse width correction portion 140 (which is explained later), when it outputs the signal instructing that the reference period be restored to the initial value to the correction execution portion 138.

The reference pulse width correction portion 140 includes a width error decision portion 142, a width stability decision portion 144, a correction number verification portion 146, and a correction execution portion 148.

The width error decision portion 142 receives outputs from the pulse width detection portion 116, logical multiplication circuit 126, and mean pulse width acquisition portion 160, compares the widths of pulses that are determined as the synchronization pulses and the mean pulse width that is acquired by the mean pulse width acquisition portion 160 and stored in the previous field, and verifies whether or not those differences are within a predetermined tolerance range, e.g., within the range of the mean pulse width ±1/8. The width error decision portion 142, in addition to carrying out these verifications, adds up the occurrences of the synchronization pulses for which the above-mentioned differences are outside of the tolerance range, and occurrences of the synchronization pulses for which the above-mentioned differences are within the tolerance range, respectively, during one field time period.

The width stability decision portion 144 receives the summation result of the width error decision portion 142 and the instruction for correction from the correction number verification portion 136 of the reference period correction portion 130, and determines the stability of the pulse widths of the synchronization pulses by verifying the frequency of occurrence that the above-mentioned difference is outside of the tolerance range when it receives the instruction for correction from the correction number verification portion 136. Specifically, the width stability decision portion 144 compares two summation results obtained by the width error decision portion 142, and determines that the pulse widths of the synchronization pulses are stable when the number of the above-mentioned differences that are within the tolerance range is equal to or greater than a threshold that is determined based on the number of the differences that are outside of the tolerance range, e.g., a value 1.25 times as large as the number of the differences that are outside of the tolerance range, and determines that the pulse widths of the synchronization pulses are unstable when that is not the case. Then, the width stability decision portion 144 outputs the decision result to the correction number verification portion 146.

Since the meaning of the decision result by the width stability decision portion 144 is similar to that of the period stability decision portion 134, the detailed explanation of it is omitted. Furthermore, similarly to the reference period correction portion 130, the reference pulse width correction portion 140 can correct either or both of the reference pulse width and the error tolerance range, and preferably, the correction of the reference pulse width has the higher priority. In this embodiment, only the reference pulse width is corrected as an example.

The correction execution portion 148 corrects the reference pulse width that is used by the width decision portion 124 so as to get closer to the mean pulse width, under the condition that the width stability decision portion 144 determines the pulse widths are unstable, and the correction number verification portion 146 verifies that the number of corrections of the reference pulse width is equal to or less than a predetermined number of times, e.g., four times.

The correction number verification portion 146 counts the number of corrections of the pulse width that are carried out after the instruction for correction from the correction number verification portion 136 of the reference period correction portion 130. Furthermore, when the width stability decision portion 144 determines that "the pulse widths are unstable", the correction number verification portion 146 outputs the instruction for correction to the correction execution portion 148 if the count number does not reach the predetermined number of four, but does not outputs the instruction for correction if the count number reaches the predetermined number of four.

In this manner, the reference period correction portion 130 carries out the corrections of the reference period until the periods are stabilized. Then, if the periods are not stabilized even when the number of corrections reaches the predetermined number, the reference period is restored to the initial value. When that happened, the reference pulse width correction portion 140 corrects the reference pulse width. Then, the reference period correction portion 130 corrects the reference period with the corrected reference pulse width. By using such loop, the reference period and the reference pulse width are corrected so as to conform to the current horizontal synchronization signal. Therefore, horizontal synchronization detection can be carried out correctly even if both period and pulse width of the horizontal synchronization signal of an input video signal are unknown in advance.

In this embodiment, the reference period correction portion 130 can stabilize the periods in a short time by repeating the correction of the reference period when the reference width has consistency. Furthermore, when the period is not stabilized even after repeating the correction of the reference period, the reference period is restored to the initial value and the reference pulse width is changed before the correction of the reference period is carried out again. Therefore, even if the original reference pulse width does not have consistency, the reference period can be re-corrected with the updated reference pulse width.

A conventional method that eliminates noises by restricting the width of pulses to be detected cannot easily eliminate noises to carry out horizontal synchronization detection. Meanwhile, a conventional method cannot eliminate noises by restricting the period of pulses to be detected unless the pulse period of the horizontal synchronization signal is known in advance. The horizontal synchronization detection device 100 in accordance with this embodiment can restrict the period of pulses to be detected, even if the pulse period of the horizontal synchronization signal is unknown in advance, by correcting the reference period based on the stability of the periods of detected synchronization pulses, and therefore, can achieve an excellent noise elimination effect. Furthermore, when the periods of synchronization pulses cannot be stabilized by the reference period correction alone, the reference pulse width is also corrected before the reference period is re-corrected. Therefore, correct horizontal synchronization detection can be carried out for horizontal synchronization signals having any sorts of pulse occurrence periods and pulse widths.

Here, the present invention has been explained with an embodiment here. The embodiment is explained only for illustrative purpose, and various modifications, additions, and subtractions are possible without departing from the spirit of the present invention. It should be understood by those skilled in the art that embodiments with such modifications, additions, and subtractions also fall within the scope of the present invention.

For example, since the mean period acquisition portion 150 calculates the mean value of the occurrence period of the synchronization pulses during the field time period as the mean period in the horizontal synchronization detection device 100, the first summation portion 152 and first division portion 154 are indispensable. The mean period acquisition portion 150 can be composed of an infinite impulse response filter (IIR filer) having a time constant in order of 1 field. In this manner, the circuit can be reduced in scale. The mean pulse width acquisition portion 160 can be also reduced in scale in a similar manner.

Furthermore, the reference period correction portion 130 may be configured to suspend its operation after a predetermined time period, e.g., a duration of several fields when the period stability decision portion 134 determines that the synchronization pulses are stabilized. The stabilization of the periods of the synchronization pulses indicates that the reference period and the reference pulse width and their error tolerance ranges conform to the current horizontal synchronization signal. Furthermore, since an abrupt change in the horizontal synchronization signal is very rare, horizontal synchronization detection can be carried out correctly even if the adjustments of the reference period and the reference pulse width are not carried out for a duration of several fields. In this manner, power consumption and processing time can be reduced. It is apparent that the present invention is not limited to the above embodiments, but may be modified and changed without departing from the scope and spirit of the invention.

What is claimed is:

1. A horizontal synchronization detection device comprising:
   a pulse detection portion to detect pulses in a horizontal synchronization signal and acquire occurrence period of the detected pulses;
   a synchronization pulse decision portion to determine pulses whose occurrence period is within an error tolerance range as synchronization pulses;
   a mean period acquisition portion to provide a mean period by averaging the occurrence periods of the synchronization pulses; and
   a reference period correction portion to carry out either or both of correcting a reference period so as to get closer to the mean period and correcting an error tolerance range of the reference period such that the error tolerance range becomes narrower, under the condition that an occurrence frequency of the synchronization pulses for which a difference between the occurrence period and the mean period is outside of the error tolerance range exceeds a predetermined threshold.

2. The horizontal synchronization detection device according to claim 1, wherein
   the pulse detection portion also acquires pulse widths of the detected pulses; and
   the synchronization pulse decision portion determines pulses whose occurrence period is within the error tolerance range and whose pulse widths are within an error tolerance range of a reference pulse width as the synchronization pulses.

3. The horizontal synchronization detection device according to claim 2, further comprising a reference pulse width correction portion to correct the reference pulse width and/or the error tolerance range of the reference pulse width when the occurrence frequency exceeds the predetermined threshold after the corrections by the reference period correction portion are carried out for a predetermined times.

4. The horizontal synchronization detection device according to claim 3, further comprising a mean pulse width acquisition portion to obtain a mean pulse width by averaging the pulse widths of the synchronization pulses,
   wherein the reference pulse width correction portion carries out either or both of correcting the reference pulse width so as to get closer to the mean pulse width and correcting the error tolerance range of the reference pulse width such that the error tolerance range becomes narrower, under the condition that the occurrence frequency of the synchronization pulses for which a difference between the pulse width and the mean pulse width is outside of the error tolerance range exceeds the predetermined threshold.

5. The horizontal synchronization detection device according to claim 4, wherein the mean pulse width acquisition portion includes an infinite impulse response filter.

6. The horizontal synchronization detection device according to claim 5, wherein the reference period correction portion restores the corrected reference period and/or the error tolerance range of the reference period to initial values when the occurrence frequency exceeds the predetermined threshold after the corrections by the reference period correction portion are carried out for the predetermined times.

7. The horizontal synchronization detection device according to claim 6, wherein the mean period acquisition portion includes an infinite impulse response filter.

8. The horizontal synchronization detection device according to claim 5, wherein the mean period acquisition portion includes an infinite impulse response filter.

9. The horizontal synchronization detection device according to claim 4, wherein the reference period correction portion restores the corrected reference period and/or the error tolerance range of the reference period to initial values when the occurrence frequency exceeds the predetermined threshold after the corrections by the reference period correction portion are carried out for the predetermined times.

10. The horizontal synchronization detection device according to claim 9, wherein the mean period acquisition portion includes an infinite impulse response filter.

11. The horizontal synchronization detection device according to claim 4, wherein the mean period acquisition portion includes an infinite impulse response filter.

12. The horizontal synchronization detection device according to claim 4, wherein the reference period correction portion suspends its operation when a difference between the occurrence period and the mean period of the synchronization pulses falls within a predetermined tolerance range.

13. The horizontal synchronization detection device according to claim 3, wherein the reference period correction portion restores the corrected reference period and/or the error tolerance range of the reference period to initial values when the occurrence frequency exceeds the predetermined threshold after the corrections by the reference period correction portion are carried out for the predetermined times.

14. The horizontal synchronization detection device according to claim 13, wherein the mean period acquisition portion includes an infinite impulse response filter.

15. The-horizontal synchronization detection device according to claim 3, wherein the mean period acquisition portion includes an infinite impulse response filter.

16. The horizontal synchronization detection device according to claim 3, wherein the reference period correction portion suspends its operation when a difference between the occurrence period and the mean period f of the synchronization pulses alls within a predetermined tolerance range.

17. The horizontal synchronization detection device according to claim 2, wherein the mean period acquisition portion includes an infinite impulse response filter.

18. The horizontal synchronization detection device according to claim 2, wherein the reference period correction portion suspends its operation when a difference between the occurrence period and the mean period of the synchronization pulses falls within a predetermined tolerance range.

19. The horizontal synchronization detection device according to claim 1, wherein the mean period acquisition portion includes an infinite impulse response filter.

20. The horizontal synchronization detection device according to claim 1, wherein the reference period correction portion suspends its operation when a difference between the occurrence period and the mean period of the synchronization pulses falls within a predetermined tolerance range.

* * * * *